United States Patent [19]

Suzuki et al.

[11] Patent Number: 4,537,489
[45] Date of Patent: Aug. 27, 1985

[54] AUTOMATIC FOCUSING DEVICE

[75] Inventors: Ryoichi Suzuki, Kanagawa; Ryuji Tokuda, Tokyo, both of Japan

[73] Assignee: Canon Kabushiki Kaisha, Tokyo, Japan

[21] Appl. No.: 597,587

[22] Filed: Apr. 9, 1984

Related U.S. Application Data

[63] Continuation of Ser. No. 407,478, Aug. 12, 1982, abandoned.

[30] Foreign Application Priority Data

Aug. 21, 1981 [JP]   Japan ............................... 56-131080

[51] Int. Cl.³ .............................................. G03B 3/10
[52] U.S. Cl. ..................................................... 354/403
[58] Field of Search .................. 354/25, 403, 402, 418, 354/401, 484, 145.1, 173.1; 356/1, 4; 250/201, 201 AF, 201 PF, 204

[56] References Cited

U.S. PATENT DOCUMENTS

| | | | |
|---|---|---|---|
| 4,053,240 | 10/1977 | Aizawa et al. | 356/4 |
| 4,199,244 | 4/1980 | Shenk | 354/401 |
| 4,257,705 | 3/1981 | Hosoe et al. | 354/403 X |
| 4,330,202 | 5/1982 | Yokota | 354/25 X |

*Primary Examiner*—William B. Perkey
*Attorney, Agent, or Firm*—Toren, McGeady, Stanger, Goldberg & Kiel

[57] ABSTRACT

An active type automatic focusing device which has a signal projecting means and an electromagnetic means for starting a focal point adjusting action actuated by a power supply to the electromagnetic means and is provided with an inhibiting means which inhibits the power supply to the signal projecting means at least during a period in which a current flows to the electromagnetic means for actuating the device.

6 Claims, 7 Drawing Figures

AUTOMATIC FOCUSING DEVICE

This is a continuation of application Ser. No. 407,478, filed Aug. 12, 1982, now abandoned.

BACKGROUND OF THE INVENTION

1. Field of the Invention

This invention relates to an active type automatic focusing device (hereinafter called AF device) which uses a signal projecting means such as an infrared ray emitting diode (hereinafter called IRED) and more particularly to an AF device using an electromagnetic means such as an electromagnet of the pulling-holding type for actuating the AF device to start movement of a lens barrel or the like.

2. Description of the Prior Art

Heretofore, control over the actuation of an AF device such as the start of a lens barrel movement and the start of beam scanning of an IRED has been accomplished through the movement of a mechanical member which is interlocked with a shutter release button with a driving force obtained from a spring force or the like. In accordance with this conventional method, however, the AF device of the lens barrel and the IRED is unlocked even when the normal operations of a shutter device, a film winding device, etc. are no longer possible due to a drop in the voltage of a power source battery. Therefore, if the shutter release button is depressed under such a condition, the AF device operates resulting in abnormal operations of the shutter and the film winding device which operate subsequent to the AF device. To solve this problem, a method of accomplishing control over the actuation of the AF device by means of a magnet has been proposed. In this method, the AF device is actuated by a pulling force developed by a power supply to an electromagnet and movement of the lens barrel or the like is stopped by cutting off the power supply employing this method. In a voltage drop of the power source battery, the power supply to the magnet is inhibited by an electric circuit means so that the AF device is prevented from operating. Therefore, the problem mentioned above can be solved by this method.

Meanwhile, this prior art method has a shortcoming in that: a sufficient large pulling force is required in attracting an armature for actuating the AF device with the pulling force of the electromagnet. A large pulling or attracting current of several hundred mA must flow at the time of the armature attraction. After the attraction, the armature is held at a yoke. This holding action merely requires a holding current of several ten mA. Meanwhile, however, in an AF device using an IRED, it is necessary to start a distance measuring action by lightening up the IRED upon actuation of the AF device by the pulling or attracting force of the electromagnet. In accordance with the current level of technique, a lighting current of several hundred mA is required for lighting an IRED. Therefore, when the pulling current for the electromagnet and the lighting current for the IRED overlap each other, the battery sustains a great burden. This causes a quick drop in the battery voltage and tends to render other control circuits inoperative. This inconvenience conspicuously arises especially at low temperatures.

SUMMARY OF THE INVENTION

It is an object of the invention to provide an automatic focusing device which is capable of solving the above stated problems of the prior art. The AF device, according to the present invention, is of the active type having a signal projecting means and is activated by a power supply to an electromagnetic means. A feature of the AF device is that the power supply to the signal projecting means is inhibited while a current is flowing to the electromagnetic means avoiding overlapped loads on the power source battery, so that the above stated inconvenience can be effectively avoided giving a stable AF device operation.

The above and further objects and features of the invention will become apparent from the following detailed description of a preferred embodiment thereof taken in conjunction with the accompanying drawings.

DESCRIPTION OF THE PREFERRED EMBODIMENT

Figure 1:
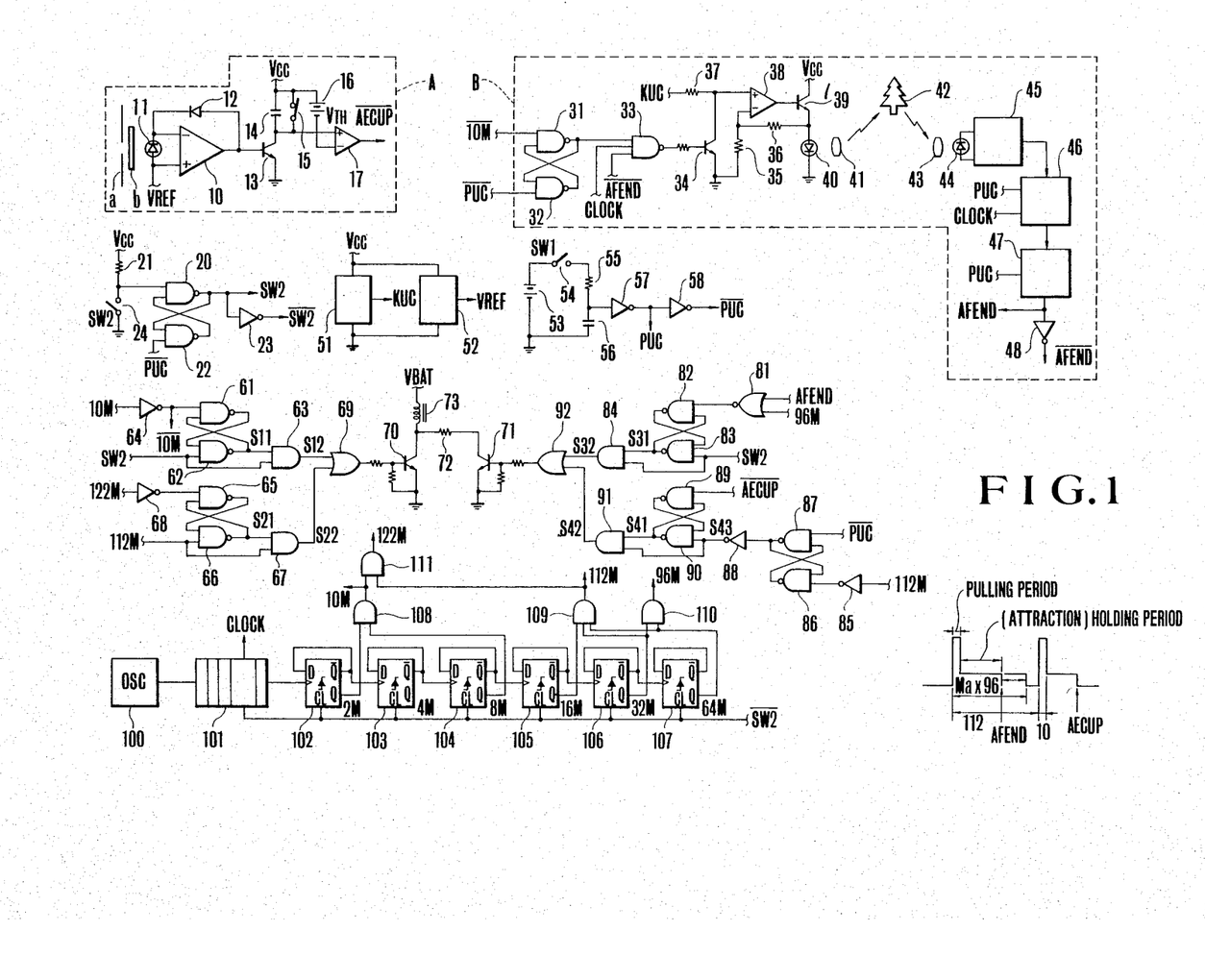
FIG. 1 is a circuit diagram showing the electric circuit arrangement of an embodiment of the invention.

Referring to FIG. 1 which shows an embodiment of the invention in a circuit diagram, the specification of the embodiment includes:

(1) An active type AF mechanism using an infrared ray emitting diode (IRED).

(2) Control over the AF device and automatic exposure control are accomplished with a single electromagnet of the pulling-and-holding type.

(3) A maximum of 96 msec is the waiting time for a focus detection completion signal. Then, 16 msec after the lapse of the waiting time, the pulling or attracting action of the shutter driving magnet begins. In other words, even when the focus detection completion signal (hereinafter called an AF END signal) is produced before lapse of the waiting time, the sequence operation does not proceed to a subsequent step until termination of the waiting time. Conversely, when the AF END signal is not produced before termination of the waiting time, an AF driving magnet holding action is forcedly released for the subsequent step of operation. (It is considered abnormal to have no AF END signal 96 msec after commencement of the pulling action of the magnet for AF.)

Again referring to FIG. 1, the embodiment is provided with a light measuring circuit A. The light measuring circuit A includes an operational amplifier 10 (hereinafter called OP amplifier) which forms a SPC head amplifier; a photogalvanic type light sensitive element 11 (hereinafter called SPC) which is connected to the two input terminals of the OP amplifier 10; and a suppressing diode 12 which is connected to the negative feedback path of the OP amplifier 10. Meanwhile, a reference voltage VREF, which is proportional to absolute temperature, is applied to the positive input terminal of the OP amplifier 10. The light measuring circuit includes an expanding transister 13 which is connected to the output terminal of the OP amplifier 10; a capacitor 14 which is provided for a time constant and is connected to the transistor 13 collector; a count start switch 15 which is connected in parallel with the time constant capacitor 14 and is changed from normally closed to open in response to an opening action of the shutter; and a comparator 17 which has the positive input terminal thereof connected to the expanding transistor 13 collector and has a reference voltage $V_{TH}$ from a positive power source Vcc impressed on the negative input terminal thereof. Upon count completion of the time constant capacitor 14, the output terminal of the comparator 17 produces a signal AECUP. A reference symbol "a" identifies an auxiliary stop; and a reference symbol "b" identifies an ND filter for obtaining information on the ASA sensitivity of the film used. A circuit B indicates a known active type AF circuit using infrared rays. The AF circuit B includes two-input NAND gates 31 and 32 which form an RS flip-flop circuit (hereinafter will be called RS-FF); and a three-input NAND gate 33. One of the three input terminals of the NAND gate 33 receives the output of the NAND gate 31. Two other input terminals of the NAND gate 33 receive a signal CLOCK and a signal $\overline{AFEND}$ which will be described hereinafter respectively. Signals $\overline{10M}$ and $\overline{PUC}$, which will be described hereinafter, are applied respectively to one of the input terminals of each of the NAND gates 31 and 32. A switching transistor 34 is connected to the output terminal of the NAND gate 33. Resistors, an OP amplifier 38 and transistors 35, 36, 38 and 39 form a constant voltage circuit. The positive input terminal of the OP amplifier 38 is connected to a reference voltage KVC which is independent of temperature. The negative input terminal of the OP amplifier 38 is connected to the voltage dividing point of the resistors 35 and 36. To the emitter of the transistor 39 is connected an infrared ray emitting diode 40 (hereinafter will be called IRED). The IRED 40 is arranged in combination with a light projecting lens 41. A reference numeral 42 indicates an object to be photographed. A light reflected by and coming from the object 42 is received by a light receiving lens 43. There is provided a photogalvanic type light sensitive element 44 (hereinafter called SPC, which senses the reflection light from the object. The output of the SPC 44 is amplified by an amplifier 45. A known peak detection circuit 46 detects the peak output value of the amplifier 45. A reference numeral 47 identifies a circuit for producing an in-focus signal (hereinafter called an AFEND signal). Furthermore, these circuits are arranged in the same manner as those disclosed in Japanese Patent Application Laid-Open No. Sho 56-52726 (1981). An inversion circuit 48 is connected to the output terminal of the in-focus signal producing circuit 47 to produuce an $\overline{AFEND}$ signal. An SW2 switch 24 closes in response to a release operation on the camera which is connected to the power source Vcc through a resistor 21. NAND gates 20 and 22 form an RS-FF. An inversion circuit 23 is connected to the output terminal of the NAND gate 20. Signals SW2 and $\overline{SW2}$ are produced respectively from the output terminals of the NAND gate 20 and the inversion circuit 23. There are provided reference voltage producing circuits 51 and 52 which, as mentioned in the foregoing, produce the reference voltage KVC which is temperature independent and the reference voltage VREF which is proportional to absolute temperature. A numeral 53 identifies a power source battery; a switch SW1 54 closes in response to a first stroke of the camera release operation; and reference numerals 55 and 56 identify a resistor and a capacitor. To a connection point between the resistor 55 and the capacitor 56 are connected inversion circuits 57 and 58. The inversion circuits 57 and 58 produce a signal PUC and a signal $\overline{PUC}$ respectively. NAND gates 61 and 62 form an RS-FF. A signal 10M, which will be described hereinafter, is supplied as a signal $\overline{10M}$ through an inversion circuit 64 to one of the input terminals of the NAND gate 61. Meanwhile, the signal SW2 is supplied to one of the input terminals of the NAND gate 62. The reference numeral 63 identifies a two-input AND gate. The signal SW2 is supplied to one of the input terminals of the AND gate 63 while the output S11 of the NAND gate 62 is supplied to the other input terminal of the AND gate 63. NAND gates 65 and 66 form another RS-FF. A signal 122M, which will be described hereinafter, is supplied to one of the input terminals of the NAND gate 65 through an inversion circuit 68. A signal 112M is supplied to one of the input terminals of the other NAND gate 66. The output S21 of the NAND gate 66 and the signal 112M are supplied to the input terminals of a two-input AND gate 67. The outputs S12 and S22 of the AND gates 63 and 67 are supplied to the input terminals of a two-input OR gate 69. NAND gates 82 and 83 also form an RS-FF. One of the input terminals of the NAND gate 82 receives the signal AFEND and a signal 96M through a NOR gate 81. The signal SW2 is supplied to one of the input terminals of the other NAND gate 83. The output S31 of the NAND gate 83 and the signal SW2 are supplied to the input terminals of a two-input AND gate 84. NAND gates 86 and 87 form an RS-FF. The signal $\overline{PUC}$ is supplied to one input terminal of the NAND gate 87 while the signal 112M is supplied to one input terminal of the NAND gate 86 through an inversion circuit 85. NAND gates 89 and 90 also form an RS-FF. One input terminal of the NAND gate 89 receives a signal $\overline{AE\ CUP}$ while the output of the NAND gate 87 is supplied to one input terminal of the other NAND gate 90 as output S43 of an inversion circuit 88. The output S41 of the NAND gate 90 and the output S43 of the inversion circuit 88 are supplied to the input terminals of a two-input AND gate 91. The outputs S32 and S42 of the NAND gates 84 and 91 are supplied to the input terminals of a two-input OR gate 92. PULL (pulling) current driving and HOLD (holding) current driving transistors 70 and 71 are respectively connected to the output terminals of the OR gates 69 and 92. The reference numeral 72 identifies a resistor for limiting the HOLD current; reference numeral 73 identifies the driving coil of an electromagnet; reference numeral 100 identifies an oscillation circuit; and a frequency dividing circuit 101 whose frequency divides the output pulses of the oscillation circuit 100. The output terminal CLOCK of the frequency dividing circuit 101 produces pulses of about 10 KHz. D flip-flop circuits 102-107 (each hereinafter called D-FF) are connected, as shown in FIG. 1, to form a frequency dividing circuit. The signal SW2 is supplied to the CLEAR terminals of the frequency dividing circuit 101 and the D-FFs 102-107. The Q outputs 2M and 8M of the D-FFs 102 and 104 are supplied to an AND gate 108. The Q outputs 16M, 32M and 64M of the D-FFs 105, 106 and 107 are supplied to an AND gate 109. The Q outputs 32M and 64M of the D-FFs 106 and 107 are supplied to another AND gate 110. The output of the AND gate 110 is called 96M. The outputs 10M and 112M of the AND gates 108 and 109 are supplied to an AND gate 111. The output of this AND gate 111 is called 122M. The meaning of these signal names 10M, 122M, etc. is as follows: The signals 10M, 112M, . . . respectively change to a high level 10 msec, 112 msec, . . . msec after a rise of the signal SW2.

Figure 2:
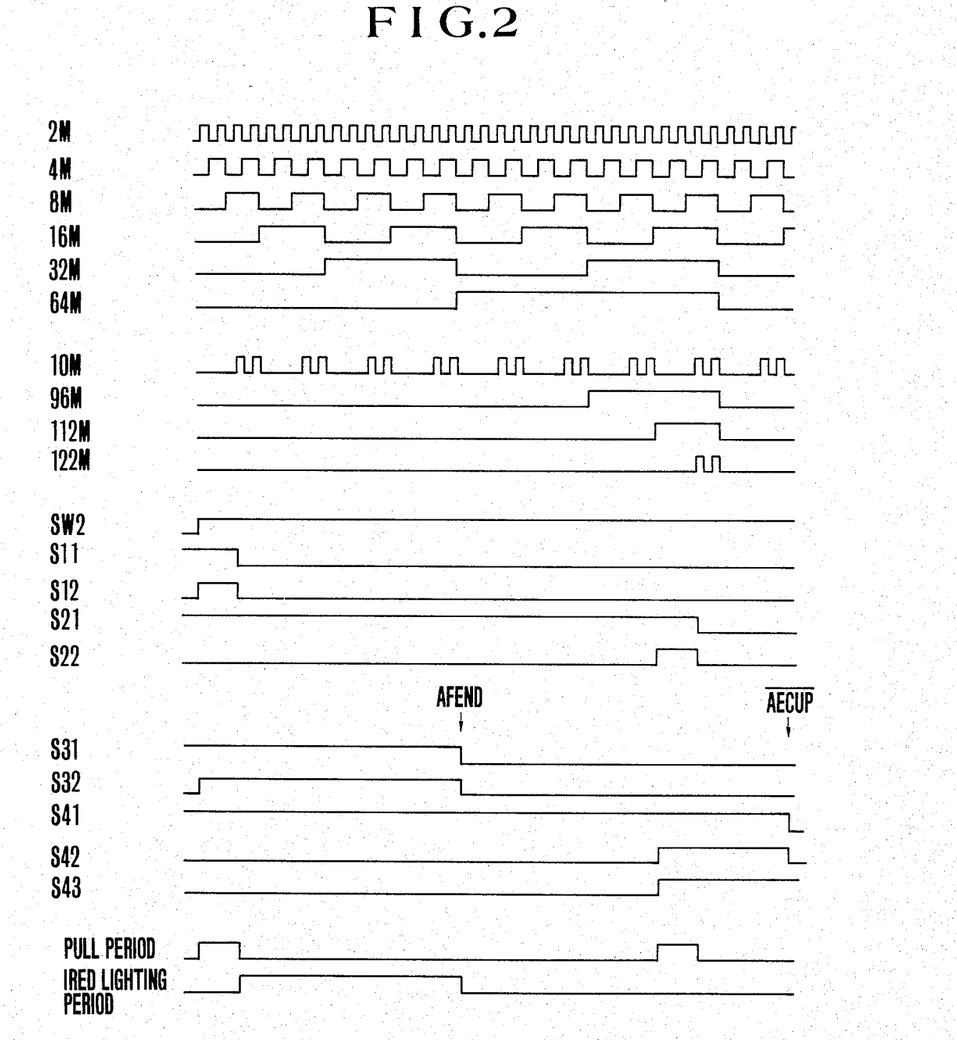
FIG. 2 is a timing chart showing the output wave forms of essential circuit blocks of the circuit arrangement shown in FIG. 1.
Figure 3:
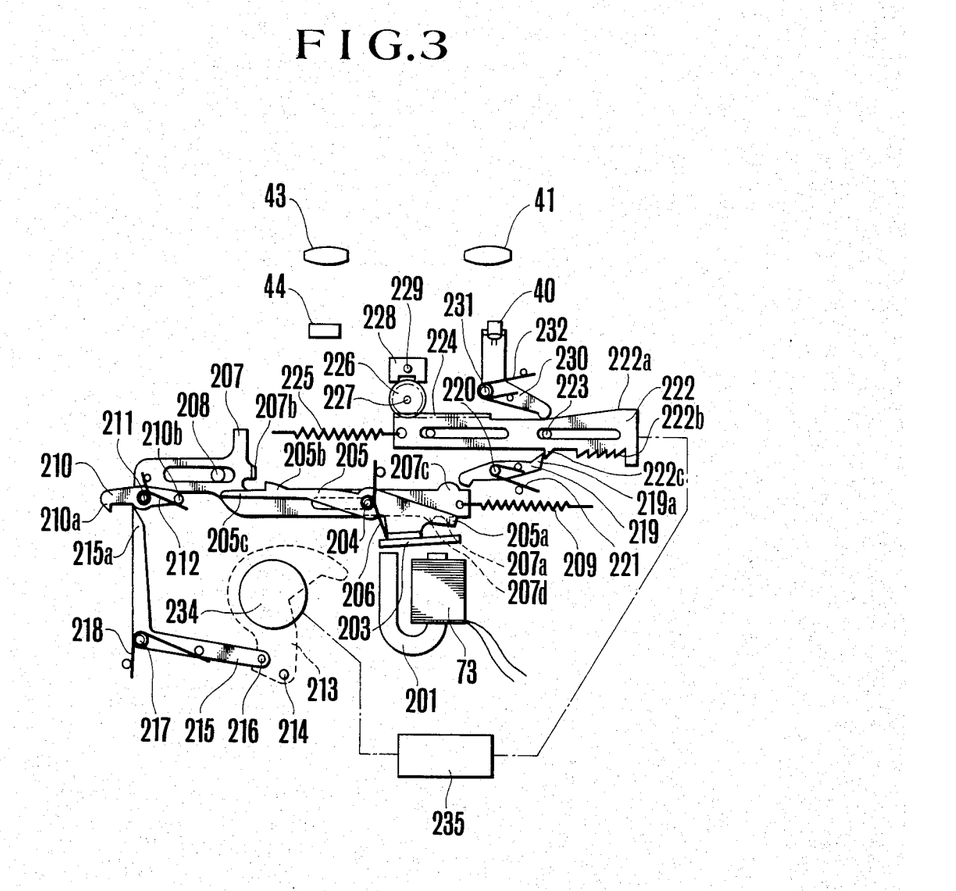
FIGS. 3-7 are plan views showing mechanical arrangement corresponding to the electrical circuit arrangement shown in FIG. 1.

Referring now to the timing chart of FIG. 2, the operation of this embodiment is described as follows: When the switch SW1 54 is closed by the first stroke of the camera release operation button, the outputs of the inversion circuits 57 and 58 are respectively kept at a high level and a low level during a short period of time before the capacitor 56 is completely charged through the resistor 55. Then, there are produced the signals PUC and $\overline{PUC}$. This signal $\overline{PUC}$ sets the output of the NAND gate 32 at a high level and that of the NAND gate 31 at a low level. The outputs of the NAND gates 22 and 20 are likewise set at a high level and a low level. Then, the outputs of the NAND gates 87 and 86 are also set at a high level and at a low level respectively. Furthermore, the peak detection circuit 46 and the AFEND signal producing circuit 47 are set in their initial states. Under this condition (SW1 waiting condition), the output of the NAND gate 20 is at a low level. Accordingly, the signal SW2 is not produced and the signal $\overline{SW2}$ is at a high level. Therefore, all the D-FF 102-107 are cleared. Their Q outputs thus remain at a low level. Accordingly, the outputs of the AND gates 108-111 are all at a low level. One input of each of the AND gates 63, 67 and 84 is at a low level. Their outputs and the outputs of the OR gates 69 and 92 therefore remain at a low level. The switching transistors 70 and 71 are off and no power is supplied to the coil 73 of the driving magnet. Furthermore, since the signal SW2, the signal 112M and the output S43 of the inversion circuit 88 are at a low level, the outputs S11, S21, S31 and S41 of the NAND gates 62, 66, 83 and 90 are all set at a high level.

When the switch SW2 is closed by a camera release operation, one input of the NAND gate 20 changes to a low level to change the output thereof to a high level. The signal SW2 is produced in this manner. Then, the output of the inversion circuit 23 changes to a low level to produce the signal $\overline{SW2}$. This causes the outputs S12 and S32 of the AND gates 63 and 84 to change to a high level. The outputs of the OR gates 69 and 92 also change to a high level to turn on the driving transistors 70 and 71. A power supply to the coil 73 of the driving electromagnet begins. With the power supplied to the coil, a mechanism which is arranged in a manner similar to the mechanism disclosed in U.S. patent application Ser. No. 279,223 and described hereinafter causes movement of a lens barrel and scanning of the IRED. Furthermore, with the signal SW2 changing to a low level, the D-FFs 102-107 are released from their cleared states. Then, the output pulses of the frequency dividing circuit 101 are further divided by the D-FFs 102-107. More specifically, the Q outputs 2M-64M of these D-FFs 102-107 change respectively to a high level 2 msec, 4 mses, 8 msec, 16 msec, 32 msec and 64 msec after the signal $\overline{SW2}$ is produced. The outputs 10M, 112M, 96M and 122M of the AND gates 108-111 change respectively to a high level 10 msec, 112 msec, 96 msec and 122 msec after the signal $\overline{SW2}$ is produced. With the signal 10M produced, when the output $\overline{10M}$ of the inversion circuit 64 changes to a low level, the output of the NAND gate 61 changes to a high level and the output S11 of the NAND gate 62 to a low level. Accordingly, the output S12 of the AND gate 63 also changes to a low level. This turns off the driving transistor 70 cutting off the supply of a PULL current to the coil 73 of the driving magnet. In other words, the PULL current flows for a period of 10 msec. However, in the meantime, a HOLD current continues to flow.

When the signal $\overline{10M}$ is produced with the output of the inversion circuit 64 having changed to a low level, the output of the NAND gate 31 changes to a high level and there is produced no signal $\overline{AFEND}$. Therefore, an inversion signal of the signal CLOCK is produced in the output of the NAND gate 33. This causes the switching transistor 34 to turn on and off. Then, the reference voltage KVC and a constant voltage, corresponding to the resistance ratio of resistors 35 and 36, are impressed on the IRED 40 in synchronization with the signal CLOCK. The IRED then emits a flickering light in accordance with the period of the signal CLOCK. The light emission by the IRED thus begins after termination of the PULL current supply for automatic focusing. With the switch SW2 closed, power is supplied to the driving magnet. Scanning of the IRED is mechanically accomplished through a mechanism which will be described hereinafter. The infrared light emitted by the IRED is reflected by the object to be photographed. The light sensitive element 44 receives the reflected light from the object. The output of the light sensitive element 44 is amplified by the amplifier 45. The amplified signal thus obtained is then synchronously detected with the signal CLOCK at the peak detection circuit 46 of the next stage. When a peak occurs in the synchronous detection output of the circuit 46, a high level signal is produced from the output thereof. Then, after the lapse of a predetermined period after the peak signal is produced, the signal AFEND is produced from the AFEND signal producing circuit of the next stage. With the signal AFEND produced, the output of the NOR gate 81 changes to a low level. The output of the NAND gate 82 changes to a high level and the output S31 of the NAND gate 83 to a low level. Therefore, the output S32 of the AND gate 84 changes to a low level turning off the driving transistor 71. With the transistor 71 turned off, the HOLD current supplied to the driving magnet is cut off. Then, the mechanism, which will be described hereinafter, stops the movement of the lens barrel and a distance measuring action ends. When the count action of the D-FFs 102-107 progresses bringing all the Q outputs of the D-FFs 105, 106 and 107 to a high level, the level of the output 112M of the AND gate 109 becomes high. Since the object S21 of the NAND gate 66 is set at a high level by this, the output S22 level of the AND gate 67 becomes high and the output level of the OR gate 69 also becomes high turning on the driving transistor 70. With the driving transistor 70 thus turned on, the PULL current is supplied for the second time to the driving magnet 73. The mechanism, which will be described hereinafter, then performs a shutter opening action. Then, 10 msec after this PULL power supply, the output 122M of the AND gate 111 changes to a high level. Accordingly, the output of the inversion circuit 68 changes to a low level and that of the NAND gate 65 to a high level respectively. Therefore, the output S21 of the NAND gate 66 and the output S22 of the AND gate 67 change to a low level turning off the driving transistor 70 and cutting off the PULL current supply. Meanwhile, when the output level of the AND gate 109 becomes high, the output of the inversion circuit 85 changes to a low level setting the outputs of the NAND gates 86 and 87 at a high level and a low level respectively. Therefore, the output S43 of the inversion circuit 88 changes to a high level. The output S42 of the AND gate 91 and the output of the OR gate 92 change to a high level turning on the driving transistor 71. With the transistor 71 thus turned on, the HOLD current continues to flow to the driving magnet 73 even fter the PULL current supply is cut off. (This also occurs in the same manner at the time of automatic focusing action.) When the shutter closing action proceeds further, the auxiliary stop "a" closes once and then again opens. The output of the OP amplifier 10 varies according to the logarithm of the quantity of light incident upon the SPC 11. A current proportional to the incident light quantity flows to the collector of the expanding transistor 13. The time constant capacitor 14 is charged with this current. When the charge voltage of the capacitor exceeds the reference voltage $V_{TH}$, the output $\overline{AECUP}$ of the comparator 17 changes to a low level. Therefore, the outputs of the NAND gates 89 and 90 are respectively set at a high level and a low level. The output S42 of the AND gate 91 changes to a low level. The output of the OR gate 92 changes also to a low level turning off the driving transistor 71. The HOLD current supply to the driving magnet then stops. A known mechanism then initiates a shutter closing action.

In this embodiment, two signals 96M and AFEND are supplied to the NOR gate 81. Therefore, when the signal AFEND is not produced for some reason, the HOLD current supply for autotmatic focusing is cut off without fail 96 msec after the signal SW2 is produced. Then, 112 msec after the signal SW2 is produced, the PULL current for shutter operation begins. In other words, the embodiment gives about 16 msec. of interval time after completion of an automaic focusing action and before commencement of a shutter operation, even in the worst case, so that mechanical malfunction can be precluded by this arrangement.

Furthermore, since the signal $\overline{10M}$ is supplied to one input terminal of each of the NAND gates 31 and 61, the IRED lights up after termination of the PULL period for automatic focusing. Therefore, the PULL current and the current for the IRED never overlap each other. However, the interval time between the commencement of a PULL action and the commencement of lighting of the IRED cannot be too long, because: If this period is too long, the IRED would not light up and distance measurement for short distances becomes impossible while IRED scanning is being performed, as a result of the PULL action. In other words, the PULL period must be set at a suitable length that is long enough to permit the magnet to perform the pulling action thereof and yet be short enough to permit distance measurement for short distances.

In this embodiment, the pulling period for automatic focusing and commencement of IRED lighting are controlled by a predetermined timing. However, the invention is not limited to such an arrangement. To accomplish this control, completion of the pulling action of the magnet may be detected by suitable means and the pulling (PULL) current may be switched over to an IRED lighting current by switching means which operates in response to a detection signal produced by the pulling completion detecting means.

FIGS. 3–7 are plan views showing mechanical arrangements corresponding to the electrical circuit arrangements shown in FIG. 1.

In these drawings, a reference numeral 201 indicates a magnet yoke. The yoke 201 is secured to a shutter base plate, which is not shown. The magnet yoke 201 is provided with a magnet coil 73 which is also shown in FIG. 1 and which produces a magnetic field when a power supply is effected thereto from the power source. An armature 203 is opposed to the fore end part of the yoke 201 leaving a slight gap between them. The armature 203 is pulled or attracted by and comes into contact with when a pulling current is impressed on the magnet coil 73. A control lever 205, which is formed into one unified body with the armature 203 and is pivotally supported by a shaft 204 secured to the shutter base plate rotates clockwise on the shaft 204 when the armature is attracted to the yoke 201. A spring 206 urges the control lever 205 in the counterclockwise direction as viewed in the drawings. A driving member or driving plate 207 is slidable in the right direction as viewed in the drawings and is guided by a shaft 208 which is secured to the shutter base plate in the same manner as the shaft 204. The driving plate 207 is also urged in the same direction by a spring 209 which is disposed at one end thereof. The driving plate 207 is provided with a locking part 207a which engages a bent part 205a formed on one side of the armature 203 in the initial state of the device; and another locking part 207d which also engages the bent part 205a when the armature is released from a first attraction by the magnet yoke 201. These locking parts 207a and 207d are adjacently disposed at the right end of the driving plate 207, as viewed in the drawings. The driving plate 207 is further provided with a locking part 207b which is at the other end to engage a notched part 205b of the control lever 205 when the armature is attracted, for the first time, by the magnet yoke 201. The driving plate 207 is arranged such that the pulling and releasing actions of the magnet yoke 201 cause the driving plate 207 to move in a stepwise manner to the right, as viewed in the drawings.

An opening lever 210 is rotatably supported by a shaft 211 which is erected on the driving plate 207. A spring 212 urges the opening lever 210 to move counterclockwise, as viewed in the drawings. The lever 210 is provided with a hooked end part 210a which engages a fore end part 215a of a shutter operating lever 215 when the driving plate 207, which moves stepwise, makes the last move thereof. At the other end of the opening lever 210, there is erected a pin 210b which is pushed by a pushing part 205c of the control lever 205 rotating the opening lever 210 clockwise when the hooked part 201a disengages from the fore end part 215a of the lever 215. A shutter blade 213 is rotatably supported by a support shaft 214 which is secured to the shutter base plate, which is not shown. There is provided another shutter blade which is symmetrically arranged with the shutter blade 213 but is omitted from the illustration for the sake of simplification. This shutter blade 213 is provided with a slot which engages a pin 216 erected on the shutter operating lever 215. The shutter blade 213 thus follows the movement of the shutter operating lever 215. A spring 218 which is rotatably supported by a support shaft 217 secured to the base plate, urges the shutter operation lever 215 to move it counterclockwise.

A clamping lever 219 is pivotally supported by a support shaft 220, which is secured to the shutter base plate. The lever 219 is urged to move counterclockwise by a spring 221. The clamping lever 219 is provided with a hooked part 219a which is formed at one end of the lever 219 and engages an initial position locking part 222c of an automatic focusing control plate 222 (hereinafter called AF control plate). When the driving plate 207 moves by one step from the initial position thereof, the protruding part 207c of the driving plate 207 pushes the other end of the clamping lever 219 upward, as viewed in the drawings. This disengages the hooked part 219a of the lever 219 from the locking part 222c of the AF control plate 222.

The AF control plate 222 is guided by pins 223 and 224 secured to the shutter base plate and is urged by a spring 225 toward the left, as viewed in the drawings. On one side of the AF control plate 222 is provided a toothed part, which engages an escape wheel 226. The wheel 226 is rotatably supported by a support shaft 227 the rotation of which is restricted by an anchor 228. The anchor 228 is swayingly mounted on a support shaft 229. When the initial position locking part 222c of the AF control plate 222 is disengaged from the locking hook 219, the AF control plate 222 moves to the plate, as viewed in the drawings, at a prescribed controlled speed. The movement of the AF control plate 222 is brought to a stop at an in-focus position with the hooked part 219a of the clamping lever 219 coming into engagement with one of the claws of a claw part 222b of the AF control plate 222.

A light projecting or emitting element lever 230 is pivotally supported by a support shaft 231 secured to a camera body or the like (not shown). The lever 230 is urged clockwise by a spring 232. One end of the lever 230 is in contact with a cam part 222a formed on one side of the AF control plate 222 while the other end has the light emitter element IRED 40, shown in FIG. 1, secured thereto. Arranged in combination with the IRED 40 are a light projecting lens 41; a light receiving lens 43; and a light sensitive element 44. These elements are secured respectively to the camera body or the like (not shown) to constitute the known mechanism of an active type automatic focus detecting device.

Although the light receiving element IRED 40 is shown in the drawing to scan from infinity to close-up, it is needless to say the element may scan from close-up to infinity.

Figure 4:
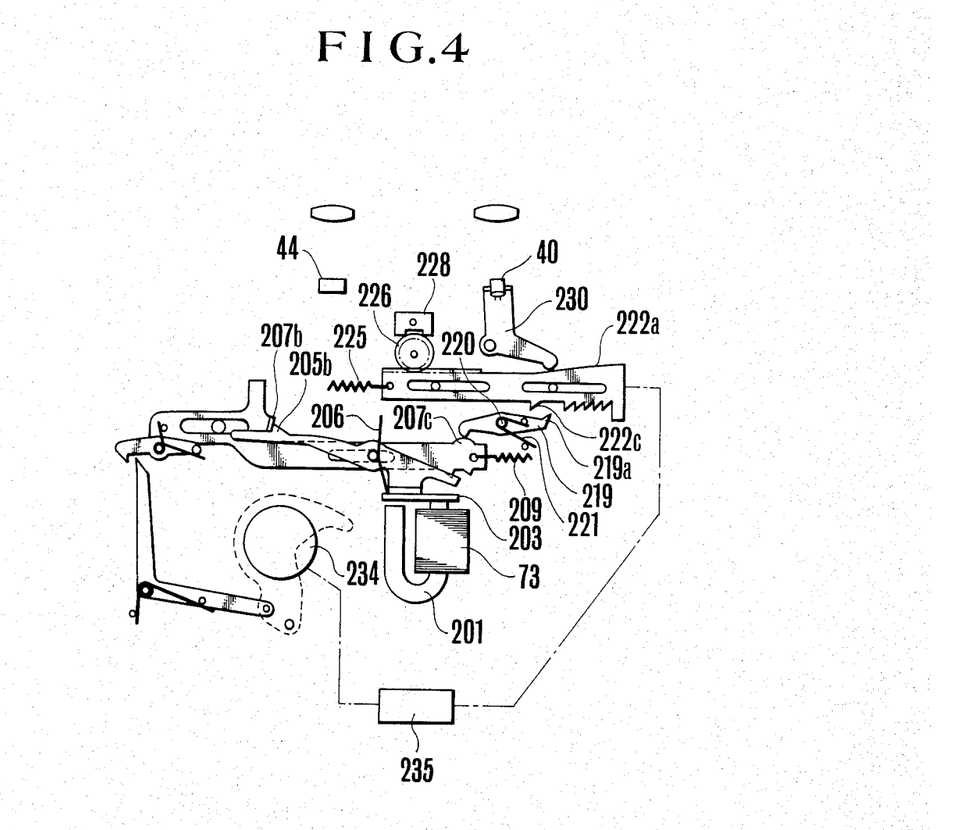

Furthermore, a focusing operation on a photo-taking lens 234 is accomplished by a known means 235 in relation to the movement of the AF control plate 222. The mechanical arrangement shown in FIGS. 3–7 operates as follows:

When the first power supply is supplied to the magnet 73 as described in the foregoing, the magnetic force developed at the magnet yoke 201 causes the armature 203 to be attracted by the fore end part of the magnet yoke 201. Then, the control lever 205, which is formed into one unified body with the armature 203, rotates on the shaft 204. The hooked end part 205a of the control lever 205 then disengages from the locking part 207a of the driving plate 207. As a result of this disengagement, the urging force of the spring 209 moves the driving plate 207 to the right, as viewed in the drawings. When the driving plate 207 moves in this manner, the movement stops once when the locking part 207b of the driving plate 207 engages the notched part 205b of the control lever 205, as shown in FIG. 4. When the driving plate 207 is stopped, the protruding part 207c of the driving plate 207 pushes one end of the clamping lever 219 upward, as viewed in the drawing. This rotates the clamping lever 219 clockwise on the support shaft 220 against the urging force of the spring 221. The clockwise rotation disengages the hooked part 219a of the clamping lever 219 from the locking part 222c of the AF control plate 222. The urging force of the spring 225 then moves the AF control plate 222 to the left, as viewed in the drawing. The movement takes place at a prescribed speed determined by the speed governing mechanism consisting of the escape wheel 226 and the anchor 228. With the AF control plate 222 moving in this manner, the light emitting element lever 230 is operated by the cam part 222a of the AF control plate 222. Therefore, the automatic focus detecting device performs a distance measuring action with the light emitting element or IRED 40 and the light sensitive element 44.

After that, when the power supply to the magnet 73 is cut off with the signal AFEND produced, the attracting force of the magnet yoke on the armature 203 disappears, as shown in FIG. 4. The urging force of the spring 206 then rotates the control lever 205 counterclockwise. The notched part 205b is disengaged from the locking part 207b of the driving plate 207. The urging force of the spring 209 then again moves the driving plate 207 to the right, as viewed in the drawing.

Figure 5:
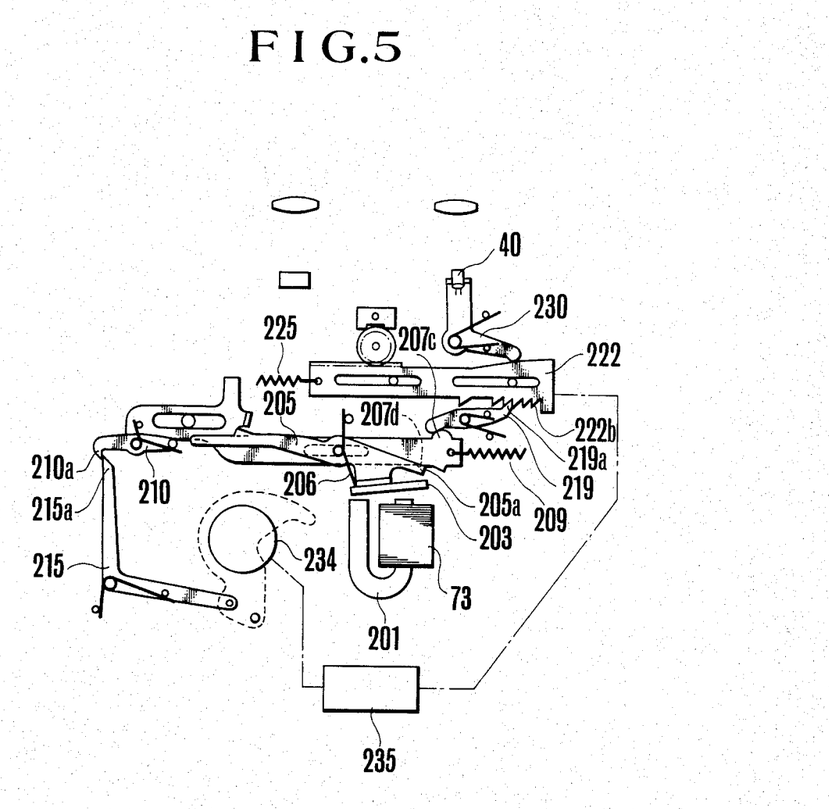

This movement of the driving plate 207 continues until the locking part 207d of the driving plate 207 comes into engagement with the hooked part 205a of the control lever 205, as shown in FIG. 5. Furthermore, the movement of the driving plate 207 disengages the clamping lever 219 from the protruding part 207c of the driving plate 207. The urging force of the spring 221 then rotates the clamping lever 219 counterclockwise. This brings the hooked part 219a of the clamping lever 219 into engagement with the claw part 222b of the AF control plate 222. This engagement then stops the leftward movement of the AF control plate 222. With the AF control plate 222 stopped, the focusing operation on the photo-taking lens 234 ends.

Figure 6:
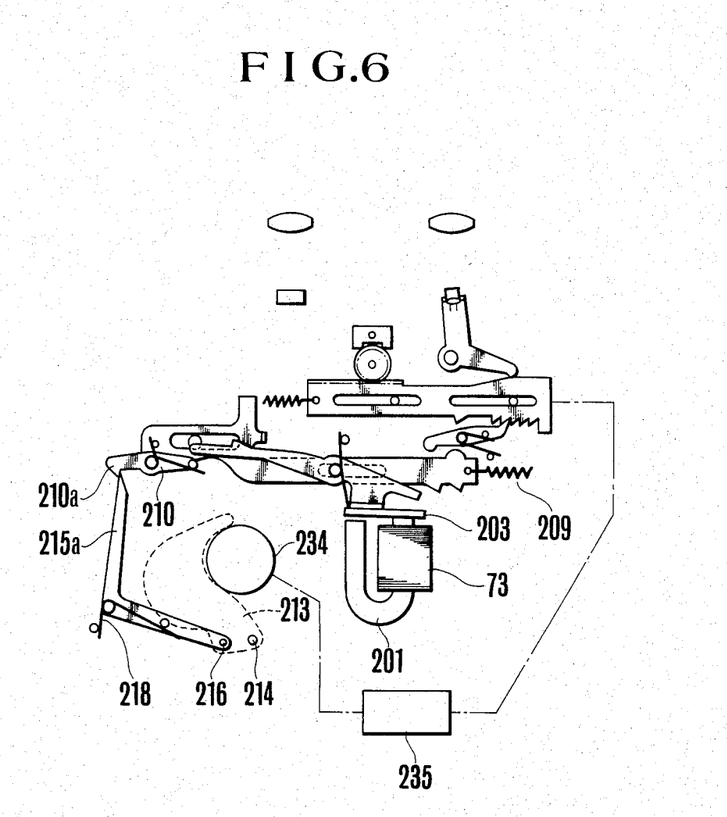
Figure 7:
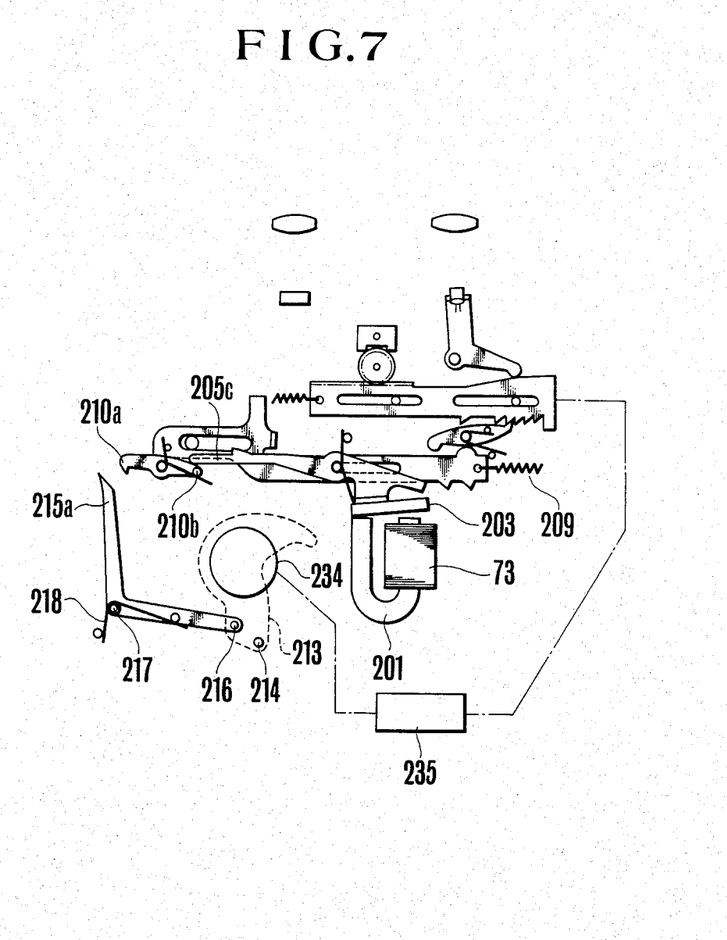

When a second power supply is supplied to the magnet 73, the magnet yoke 201 again pulls the armature 203. With the armature 203 pulled or attracted again, the locking part 207d of the driving plate 207 and the hooked part 205a of the control lever 205 are disengaged from each other. The urging force of the spring 209 then moves the driving plate 207 to the right, as viewed in the drawing. At this time, the hooked part 210a of the opening lever 210, which is rotatably attached to one end of the driving plate 207, is engaging the fore end part 215a of the shutter operating lever 215. Therefore, the shutter operating lever 215 rotates counterclockwise as the driving plate 207 moves, as shown in FIG. 6. This rotation of the shutter operating lever 215 rotates the shutter blade 213 counterclockwise on the support shaft 214 and exposure begins accordingly. Upon completion of exposure, the power supply to the magnet coil 73 is cut off. With the power supply cut off, the attracting force of the magnet yoke 201 on the armature disappears. Therefore, the urging force of the spring 206 rotates the control lever 205 counterclockwise, as shown in FIG. 7. Then, a pushing part 205c of the control lever 205 pushes down a pin 210b provided on the opening lever 210. With the pin 210b thus depressed, the hooked part 210a of the lever 210 disengages from the fore end part 215a of the shutter operating lever 215. As a result of this, the urging force of the spring 218 rotates the shutter operating lever 215 counterclockwise. The shutter blade 213 then also rotates in the return direction thereof to close the shutter.

In accordance with the present invention, the power supply to signal projecting means is inhibited during the period when power is supplied to the electromagnetic means, as described in detail in the foregoing. This arrangement therefore precludes the possibility of overlapped imposition of loads on the battery, so that the automatic focusing operation can be accomplished in a stable manner. While a preferred embodiment of the invention has been described in the foregoing, it will be understood that various modifications may be made therein within the true spirit and scope of the invention.

What is claimed is:

1. An active type automatic focusing device having signal projecting means and electromagnetic means for initiating a focal point adjusting action, the automatic focusing device comprising:

signal producing means for producing a control signal;

first power supply means for effecting a power supply for operating said projecting means, said first power supply means being arranged to begin to effect the power supply to said signal projecting means in response to the signal produced from said signal producing means; and second power supply means for effecting a power supply for actuating said electromagnetic means, said second power supply means being arranged to effect the power supply to said electromagnetic means until the signal is produced from said signal producing means wherein said signal producing means is arranged to produce said signal after the lapse of a period of time long enough for allowing said electromagnetic means to complete an action for initiating said focal point adjusting action.

2. A device according to claim 1, further including a lens and lens moving means, said lens moving means being arranged to begin to move the lens in response to the actuation of said electromagnetic means.

3. A device according to claim 1, further including means for varying the signal projecting direction of said signal projecting means in response to the actuation of said electromagnetic means.

4. A device according to claim 1, further including third power supply means for effecting a power supply to said electromagnetic means, said third power supply means being arranged to effect said power supply in such a way as to maintain said electromagnetic means in a state of having completed the operation for starting the automatic focal adjusting operation.

5. A device according to claim 4, further including switching means for actuating said second power supply means and said signal producing means.

6. An automatic focusing device of an active type which performs an automatic focal point adjusting operation upon receipt of a signal reflected from an object, comprising:

(a) electromagnetic means for controlling the starting of the focal point adjusting operation;
(b) means for projecting the signal to the object;
(c) power supplying means; and
(d) control means which permits the power supply to the electromagnetic means from the power supply means for starting the focal point adjusting operation during a period long enough for the electromagnetic means to complete an operation required for starting the focal point adjusting operation and permits the power supply to the signal projecting means from the power supply means for projecting the signal to the object.

* * * * *